United States Patent

Rijks et al.

(10) Patent No.: US 8,027,143 B2
(45) Date of Patent: Sep. 27, 2011

(54) MEMS TUNABLE DEVICE

(75) Inventors: Theodoor Gertrudis Silvester Maria Rijks, Eindhoven (NL); Peter Gerard Steeneken, Valkenswaard (NL)

(73) Assignee: EPCOS AG, Munich (DE)

( * ) Notice: Subject to any disclaimer, the term of this patent is extended or adjusted under 35 U.S.C. 154(b) by 708 days.

(21) Appl. No.: 12/090,004

(22) PCT Filed: Oct. 10, 2006

(86) PCT No.: PCT/IB2006/053711
§ 371 (c)(1), (2), (4) Date: Apr. 11, 2008

(87) PCT Pub. No.: WO2007/043006
PCT Pub. Date: Apr. 19, 2007

(65) Prior Publication Data
US 2008/0253057 A1 Oct. 16, 2008

(30) Foreign Application Priority Data
Oct. 14, 2005 (EP) .................................... 05109574

(51) Int. Cl.
H01G 7/00 (2006.01)
H01G 7/06 (2006.01)
H01G 5/16 (2006.01)
H01G 5/019 (2006.01)

(52) U.S. Cl. .................. 361/281; 361/290; 361/300
(58) Field of Classification Search .................. 361/281, 361/287, 280, 277, 300, 290
See application file for complete search history.

(56) References Cited

U.S. PATENT DOCUMENTS

| | | | | |
|---|---|---|---|---|
| 7,468,829 | B2 * | 12/2008 | Ogikubo et al. | 359/290 |
| 7,657,242 | B2 * | 2/2010 | Floyd | 455/262 |
| 2002/0025595 | A1 | 2/2002 | Xu et al. | |
| 2002/0066659 | A1 | 6/2002 | Ryhanen et al. | |

(Continued)

FOREIGN PATENT DOCUMENTS

EP  1473691 A2  11/2004

(Continued)

OTHER PUBLICATIONS

Rijks, T., G., S; et al "MEMS Tunable Capacitors and Switches for RF Applications" Proceedings of the 24th International Conference on Microelectronics (MIEL 2004), NIS, Serbia, vol. 1, May 16-19, 2004, pp. 49-56.

(Continued)

*Primary Examiner* — Eric Thomas
*Assistant Examiner* — David M Sinclair
(74) *Attorney, Agent, or Firm* — Slater & Matsil, L.L.P.

(57) ABSTRACT

A micro-electromechanical device has a substrate (60), a movable element (15), a pair of electrodes (40) arranged on the substrate and on the movable element to move the movable element, and a controller (50) to supply the electrodes. To move the movable element to an intermediate position one or more pulses are applied during the movement, timed to compensate for under or over damping of the movement. This can reduce a settling delay. It can be applied to tunable RF capacitors. To control a decrease in the gap, a single pulse of a maximum supply level compensates for the inherent slowness of the device and over damping. To compensate for under damping, the pulses have a period corresponding to a resonant frequency, and comprise peaks and troughs above and below the final supply level, such that successive ones of the peaks and troughs are closer to the given supply level.

15 Claims, 4 Drawing Sheets

U.S. PATENT DOCUMENTS

2002/0075626 A1    6/2002   Liu et al.

FOREIGN PATENT DOCUMENTS

| JP | 08-247767 A | 9/1996 |
| JP | 10-335675 A | 12/1998 |
| JP | 2002-036197 A | 2/2002 |
| JP | 2004-172504 A | 6/2004 |
| WO | 2004000717 A2 | 12/2003 |

OTHER PUBLICATIONS

Van Beek, J.T.M., et al., "High-Q integrated RF passives and RF-MEMS on silicon," Materials Research Society Symposium Proceedings (2004), vol. 783, pp. 97-108, Materials Research Society.

* cited by examiner

MEMS TUNABLE DEVICE

The present invention relates to MEMS devices, and to corresponding methods of controlling and manufacturing such devices, and more particularly relates to MEMS tunable capacitor devices.

The term 'MEMS' (Micro-electromechanical system or structure or switch) can encompass various devices. A common arrangement of a MEM device comprises a moveable item such as a freestanding beam with a first electrode located opposite a second electrode. The first and the second electrode are mutually separated by an air gap. The first electrode can be moved towards the second electrode by application of an actuation voltage to provide an electrostatic force. The spring force is used to move the first electrode away from the second electrode. Other forces could be used such as an inductive force from current in electrodes in the form of coils, air pressure etc. MEMS devices usually have the following properties: small component size, e.g. in the micron range (about the thickness of human hair), electro-controllable with electrical signals, and mechanical in the sense of containing moving parts.

Some common applications are:
- a microphone or a loudspeaker; (using a specific type of membrane)
- a sensor, particularly an air pressure sensor
- a resonator
- pixel switches in a display, or driving a mirror for an optical switch,
- a switch or as a variable capacitance in RF applications.

One of the commercially important applications is the use of MEMS devices for variable impedance matching with integrated band switching in the front end of a mobile wireless device such as a phone or computer, e.g. laptop. An example of a variable capacitor using a MEM device is shown in WO 2004/000717. Tunable capacitors can be formed from metal-based MEMS, and are very promising for application in RF architectures, e.g. in adaptive impedance matching networks or in tunable LC VCO tank circuits.

A disadvantage of these devices is, however, that they are inherently slow, especially when the actuation voltage is close to the closing voltage. The closing voltage is the voltage at which the displacement of the top metal has reached the point that the middle gap closes. At atmospheric pressure, damping effects dominate over inertial effects. In this limit it can be calculated that near the closing voltage not only the velocity of the moving electrode but also the derivative of the velocity with respect to the displacement approaches zero when the equilibrium displacement, determined by the balance of the electrostatic force and the spring force, is reached. Unfortunately, the largest capacitance change takes place just below the closing voltage.

An object of the invention is to provide improved MEMS devices, and corresponding methods of controlling and manufacturing such devices, and more particularly improved MEMS tunable capacitor devices. An advantage of the present invention is higher speed of reaching a working point for a tunable MEMS device, e.g. with moveable members and a settable gap therebetween.

According to a first aspect, the invention provides: a micro-electromechanical device having a substrate, a movable element, a pair of electrodes arranged on the substrate and on the movable element to cooperate to move the movable element relative to the substrate, and a controller arranged to supply electrical power to the electrodes to move the movable element to an intermediate position between a maximum and a minimum position, the controller providing one or more pulses at a first level higher than a second level required to hold the electrodes at the intermediate position and then reducing to the second level to stabilize the moveable element at the intermediate position. The preferred first level is a voltage close to the maximum that can be applied, e.g. without breakdown. To provide this voltage a separate voltage generator may be provided. Instead of voltage a current can be applied for an inductive device.

Optionally, every time the moveable element is moved in one direction only the first level is applied independent of the intermediate position to be obtained. The length of time the pulse at the first level is applied is varied to bring the moveable element close to the desired final position.

To compensate for over damping of the movement and/or the inherent slowness mentioned before, the controller drives the moveable element as fast as possible to the intermediate position at the highest voltage available and one which is preferably much higher than the voltage required to hold the moveable element at the intermediate position. When the pulse or pulses are applied the electrodes may be forced into a ringing state if the device is under damped. In this case the ringing can be suppressed by active damping. The ringing can be detected by the oscillatory change in capacitance of the electrodes and a suitable inverse driving voltage generated therefrom to suppress the ringing. This can reduce a settling delay and so help to overcome the disadvantages of such delays. The advantages can apply to any tunable device in principle.

According to a another aspect, the invention provides: a micro-electromechanical device having a substrate, a movable element, a pair of electrodes arranged on the substrate and on the movable element to cooperate to move the movable element relative to the substrate, and a controller arranged to supply electrical power to the electrodes to move the movable element to an intermediate position between a maximum and a minimum position, the controller providing electrical power to overcome ringing by active damping. This method can be applied to any tunable device in principle.

An embodiment of the present invention provides a micro-electromechanical device having a substrate, a movable element, a pair of electrodes arranged on the substrate and on the movable element to cooperate to move the movable element relative to the substrate, and a controller arranged to supply the electrodes with electrical power to move the movable element to an intermediate position between a maximum and a minimum position, e.g. the intermediate position corresponding to a given power supply level applied to the electrodes, by supplying to the electrodes one or more pulses during the movement, followed by the given supply level, the pulse or pulses being timed to compensate for the inherent slowness and/or for under or over damping of the movement. This can reduce a settling delay and so help to overcome the disadvantages of such delays. The advantages can apply to any tunable device in principle.

As an additional feature of some embodiments, the pulse or pulses are dependent on whether the movement is to reduce a gap or increase the gap between the electrodes. This typically determines whether the movement is under damped or over damped, and hence whether the pulses should add or overcome the damping to reduce the settling time.

As another such additional feature, the controller is arranged to control a voltage differential between the electrodes to vary an electrostatic force. This is typically more power efficient than alternatives such as using inductive force.

As another such additional feature, to control a decrease in the gap, the controller is arranged to supply a single pulse of a maximum supply level. This suits a device for which such decreases are overdamped, which is a common situation.

As another such additional feature, the duration of the single pulse is dependent on the supply levels before and after the movement.

As another such additional feature, to control an increase in the gap, the controller is arranged to supply a sequence of pulses timed to dampen oscillations of the movable element. This suits a device for which such decreases are under damped, which is a common situation.

As another such additional feature, the sequence is dependent on the supply levels before and after the movement.

As another such additional feature, the sequence has a period corresponding to a resonant frequency, and comprises a number of peaks and troughs above and below the given supply level, such that successive ones of the peaks and troughs are closer to the given supply level.

As another such additional feature, the device has capacitor electrodes on the substrate and on the movable element, to form a tunable capacitor.

As another additional feature, a resilient coupling is provided to bias the movable element. This can provide a simpler structure or more precise positioning than a floating movable element needing multiple pairs of electrodes.

As another additional feature, the resilient coupling is arranged on at least two sides of the movable element. This can provide a more stable and reliable structure with less susceptibility to vibration and manufacturing variations for example.

Other aspects of the invention include corresponding methods of controlling such a device.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

How the present invention may be put into effect will now be described by way of example with reference to the appended drawings, in which.

The scope of the claims of this invention is not limited to only the embodiments explicitly disclosed. Any reference signs do not limit the scope of the claims. The word "comprising" does not exclude the presence of other elements or steps than those listed in a claim. Use of the word "a" or "an" preceding an element does not exclude the presence of a plurality of such elements.

Dual-gap parallel-plate tunable capacitors combine a large continuous and reversible capacitance tuning, typically a tuning ratio of 4-5, with a high quality factor, typically 300 at 1 pF and 2 GHz (Rijks et al., to be published, and references therein). The tuning ratio is defined as $C(V)/C(0)$. The concept is illustrated schematically in FIG. 1. This figure shows a cross-sectional view of a dual-gap relay-type tunable capacitor. The actuation capacitors with a large air gap are separated from the RF capacitor with a small air gap. When $d1/d2<\frac{1}{3}$ continuous tuning of the gap d1 is possible without being limited by the pull-in effect. As the moveable element has a finite stiffness, bumps at the edges of the structure prevent pull-in of the actuation capacitors.

Figure 2:
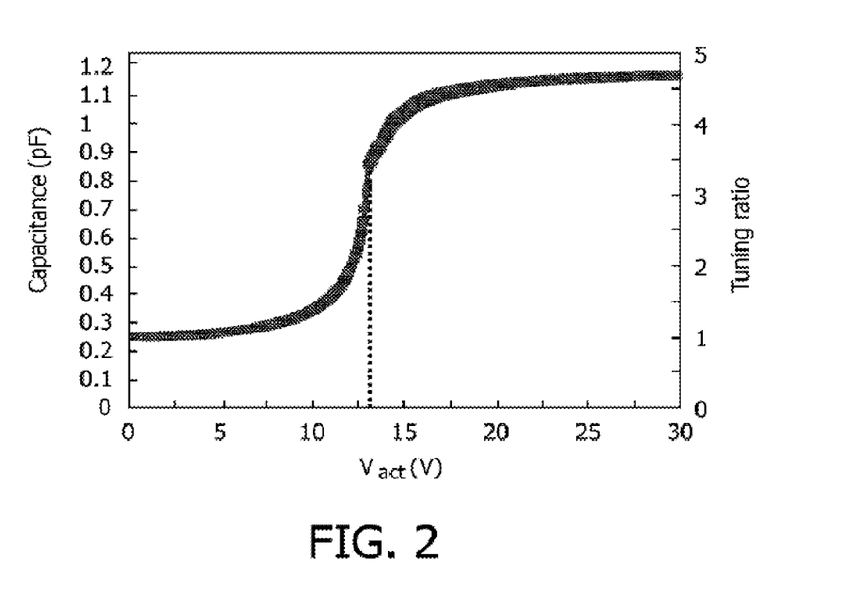
FIG. 2 shows a graph of capacitance versus actuation voltage.

FIG. 2 shows a tuning curve of measured capacitance and tuning ratio as a function of the actuation voltage. The dotted line indicates the closing voltage. Contrary to a switch, for which only two states are important, all states between the open and closed state should be addressable by choosing the appropriate actuation voltage.

Figure 3:
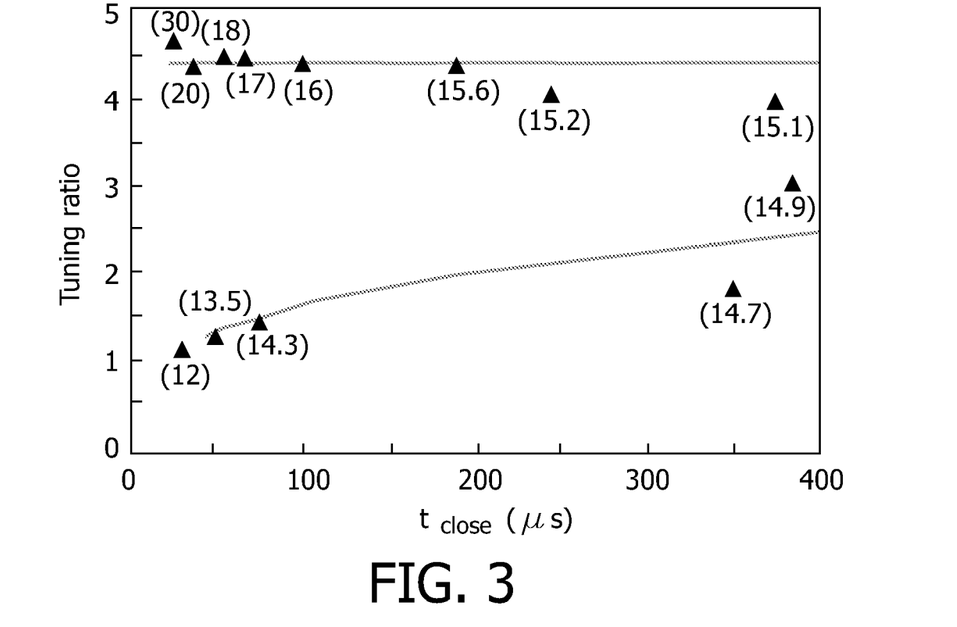
FIG. 3 shows a graph of tuning ratio versus closing time.

A disadvantage of these devices is, however, that they are inherently slow, especially when the actuation voltage is close to the closing voltage. The closing voltage is the voltage at which the displacement of the top metal $x=d1$ and the middle gap closes. At atmospheric pressure, damping effects dominate over inertial effects. In this limit it can be calculated that near the closing voltage not only the velocity of the moving electrode but also the derivative of the velocity with respect to the displacement approaches zero when the equilibrium displacement, determined by the balance of the electrostatic force and the spring force, is reached. Unfortunately, the largest capacitance change takes place just below the closing voltage (see FIG. 2). FIG. 3 shows the tuning ratio versus closing time (time to go from $C(0)$ to $C(V)$) measured when applying a step-function voltage). In FIG. 3 the triangles have been derived from the measurements, the numbers in brackets indicate the actuation voltage in volts applied at $t=0$. The line has been calculated. The closing voltage of this device is about 15 V.

The embodiments show methods of actuating tunable MEMS devices, which result in faster tuning. Some embodiments of the tunable device such as a capacitor, are actuated with a well-timed voltage pulse with a voltage higher than the voltage required to hold the tunable device in the final desired position. Such a voltage is applied with differing pulse lengths $\Delta t_{pulse}$ to bring the tuning device close to the final desired position. In other embodiments the actuation is with the highest allowable voltage ($V_{max} \gg V_{close}$) Vmax/Vclose is typically 2-5. and a having a certain pulse length $\Delta t_{pulse}$ such that the highest possible tuning speed is achieved, followed by a second voltage $V_{final}$ to stabilize the required state. In particular dual-gap parallel plate tunable MEMS capacitors can exploit this.

Two common constructions of MEMS devices are as follows:

1. A MEMS structure in a semiconductor substrate such as silicon. In this case the electrodes are oriented perpendicular to the substrate surface. This construction can be used for sensor applications and for resonator applications but other applications are not excluded.

2. A MEMS structure as a thin-film element. The movable element in the form of a beam is typically oriented substantially parallel to the substrate. This type of MEMS structure is used typically for RF MEMS. There are at least two constructions for the beam:

a double clamped beam, i.e. a beam that is connected to the substrate surface at two or more sides, to form a resilient coupling so the deflection towards the substrate occurs in the centre of the beam,     a single clamped (cantilever) beam in which case the deflection to the substrate occurs at the end of the beam.

The beam is generally provided with holes, that are present as a consequence of the etching of the sacrificial layer between the beam and the substrate to create the air gap. These holes also help to reduce air damping by allowing air to flow in and out of the cavity between beam and substrate, while opening or closing the beam. An example of a variable capacitor using a MEM device is shown in WO 2004/000717. Here it is explained that the capacitance increases as the gap between the electrodes is reduced. The motion is restricted by a mechanical spring force, which is directly proportional to the distance traveled by the moveable electrode. However, the electrostatic attractive force has a non-linear relationship with changes in the gap as the moveable electrode moves. Thus there is a point when the attractive force overcomes the spring force and the electrodes collapse together. The control voltage at which this occurs is called the "Pull in" voltage, $V_{PI}$. This document also explains that this limits the capacitance tuning ratio to 1.5, which is inadequate for many applications. To increase this ratio, it is known to provide separate electrodes for the capacitor and for the application of electrostatic force to the beam, with a smaller gap being provided for the capacitor electrodes.

Figure 1:
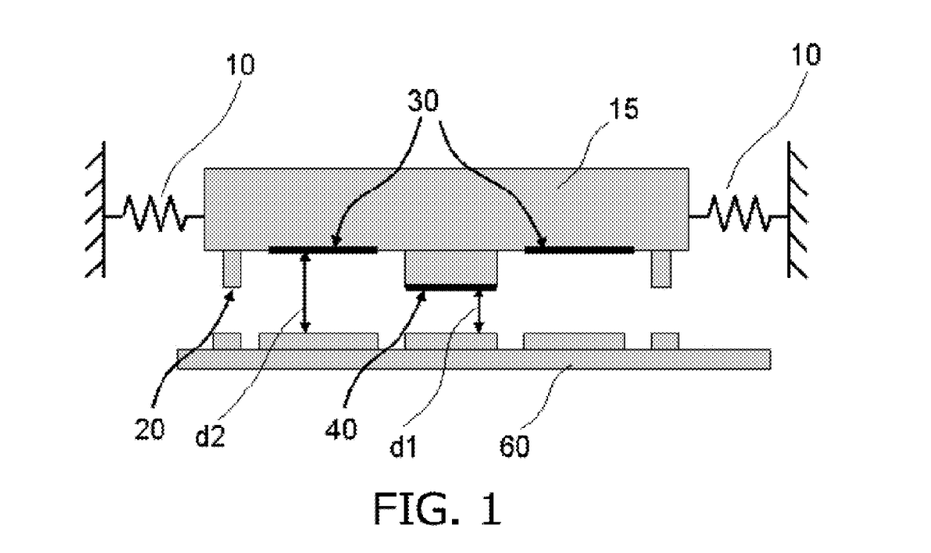
FIG. 1 shows a schematic view of a MEMS tunable capacitor.

A first embodiment of the invention can make use of the arrangement illustrated in FIG. 1 and will be described with reference to a device for use at radio frequencies (RF). This shows a movable element 15 held by resilient couplings 10. Capacitor electrodes 40 are provided on both the substrate and the movable element, defining a gap d1. Drive electrodes 30 for moving the movable element to tune the capacitor are provided on both the substrate and the movable element, defining gap d2, larger than d1. A stopper 20 can be provided to prevent pull in of the electrodes. The moving top electrode is typically the common ground for DC and RF. The bottom electrode is segmented in this case, as shown in FIG. 1, and mounted on a substrate 60. The centre bottom electrode is used for the RF capacitor (small air gap), the left and right bottom electrodes are connected to the DC actuation (large air gap to prevent pull in). An electrode voltage controller 50 supplies the voltage or current to the drive electrodes necessary to move the movable element.

The MEMS structure can be manufactured using the known manufacturing processes of the applicant, called PASSI™ or CoSip (also known as PICS or Silicon-based Sip SbSiP). These provide a process flow in which passive components like coils, capacitors and resistors, MEMS switches and tuneable capacitors for mobile phone applications for example. A difference of RF-MEMS compared to standard PASSI™ is a sacrificial layer etching step in order to create surface-micromachined free-hanging structures. More details can be found in: J. T. M. van Beek et al., High-Q integrated RF passives and RF-MEMS on silicon: Materials, integration and packaging issues for high-frequency devices symp. Boston 2003. Ed. by P. Muralt et al. *MRS Fall meeting*. Vol. 783. Warrendale, MRS Materials Research Soc., 97-108, 2004, and in: T. G. S. Rijks et ai, MEMS tunable capacitors and switches for RF applications, MIEL 2004, Nis, Serbia, 24h *Int. Cont Microelectronics*, Conference proceedings.

Figure 4:
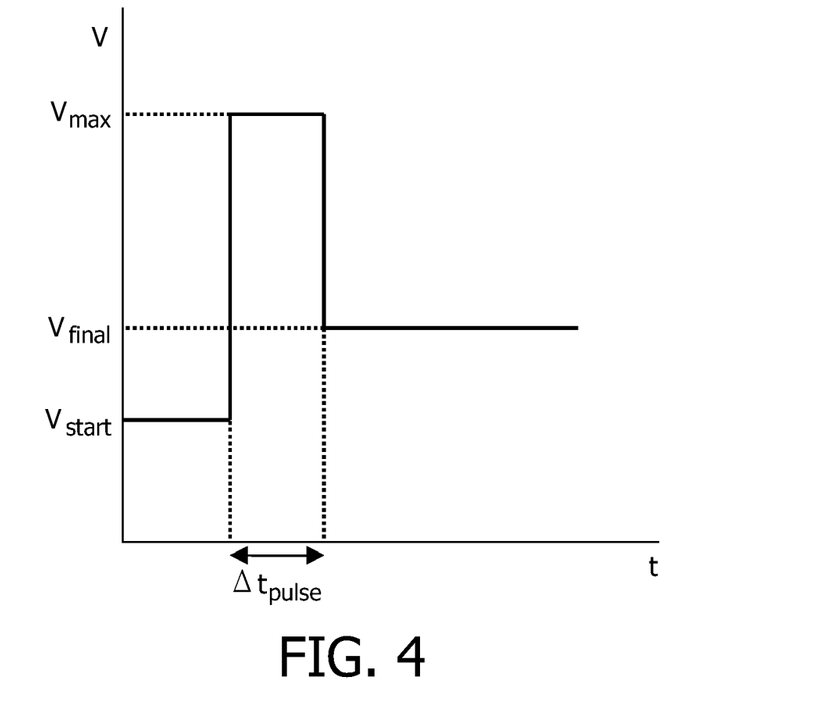
FIG. 4 shows a pulse in the actuation voltage during movement according to an embodiment of the present invention.
Figure 6:
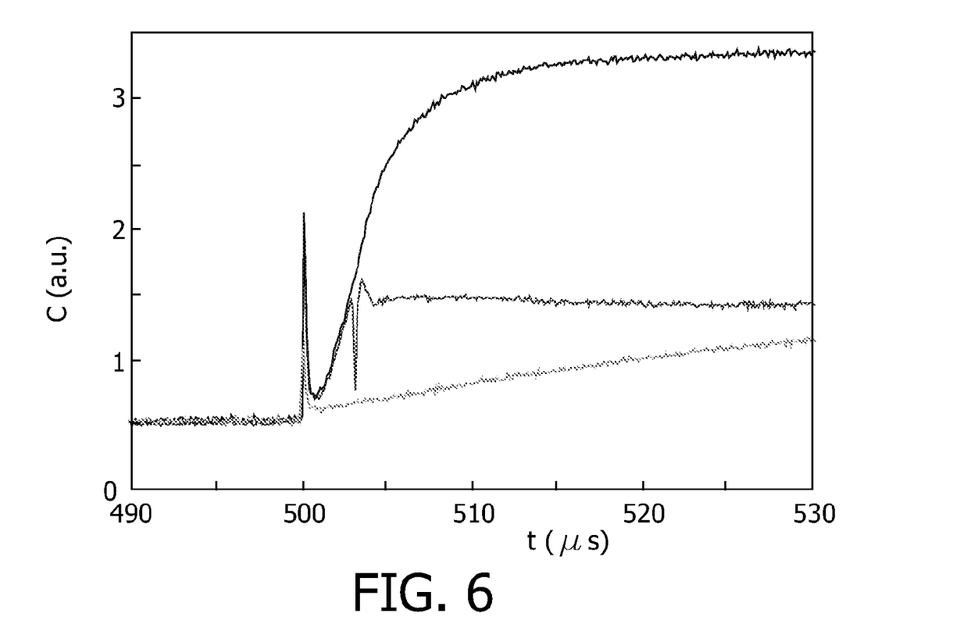
FIG. 6 shows graphs of settling time of capacitance.
Figure 7:
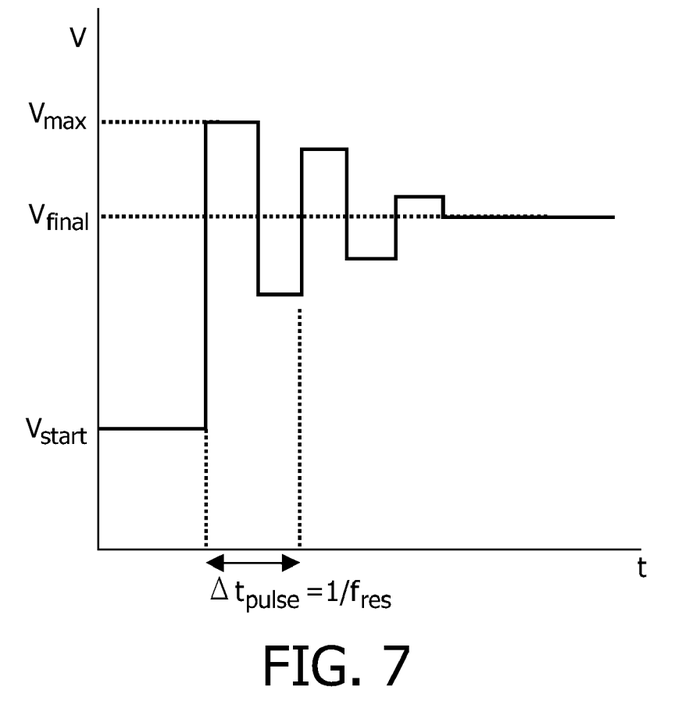
FIG. 7 shows pulses in the actuation voltage during movement according to another embodiment of the present invention.

Some embodiments of the present invention actuate the tunable capacitor with a well-timed voltage pulse with a voltage higher than the voltage required to hold the capacitor in its final position and in some embodiments the actuation is with the highest allowed voltage $V_{max} \gg V_{close}$. Such a pulse is applied for a pulse length $t_{pulse}$ to bring the capacitor as close as possible to its final desired position in order to achieve the highest possible tuning speed, followed by dropping to lower a second voltage $V_{final}$ to stabilize the required state. An example is shown in FIG. 4. The problem described above and the measure to solve it apply particularly to all arrangements where there is upward tuning (i.e. increasing the capacitance). An example is shown in FIG. 6. For downward tuning (i.e. the reduction of the capacitance, meaning the opening time of a capacitive MEMS switch) the tuning speed is determined by the spring force and the air damping and there can be underdamping and therefore ringing after the application of a pulse as described above. In this case a subsequent different sequence of pulses can be used to reduce settling time by providing pulses timed to be out of phase with the ringing. An example is shown in FIG. 7 described below. By minimizing the oscillations, this can reduce the tuning time.

Figure 5:
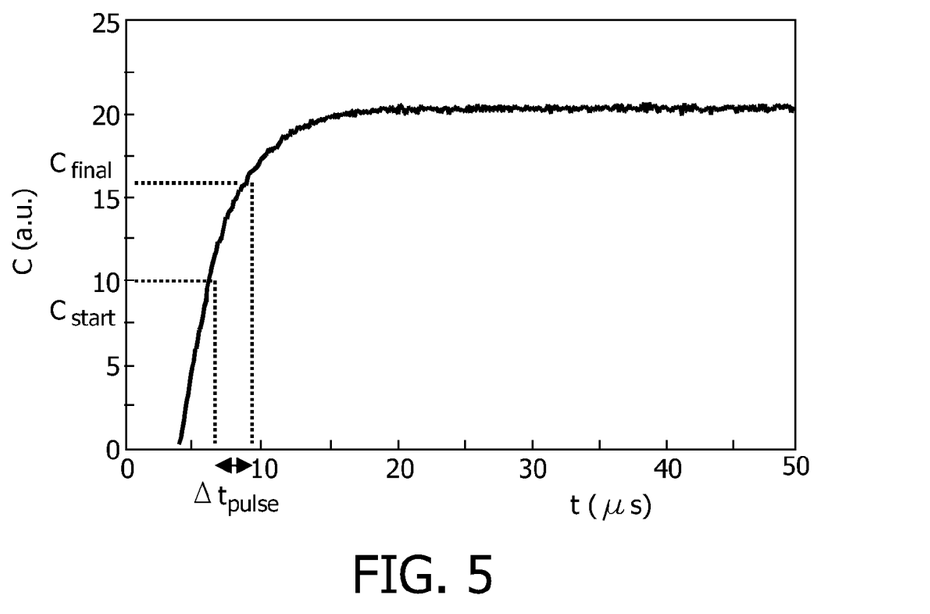
FIG. 5 shows a graph of capacitance versus time measured at V=Vmax.

In FIG. 4, $V_{start}$ defines the starting or present voltage applied to the tunable capacitor, having a capacitance $C_{start}$. $V_{final}$ is the voltage that determines the final or new state of the tunable capacitor, $C_{final}$. Both voltages can be derived from a C-V curve as in FIG. 2. As shown in FIG. 4 a pulse of $V_{max}$ is applied. At the end of the pulse $V_{final}$ is applied to maintain the electrodes and therefore the capacitance at a constant value. $V_{max}$ is a voltage above $V_{final}$ and is preferably the maximum allowed (e.g. maximum possible without serious risk of damage or breakdown) actuation voltage. When neglecting inertia, $\Delta t_{pulse}$ can be derived from the C-t curve at $V_{max}$, as shown in FIG. 5. This figure shows a time response of the capacitance when applying a step-function actuation voltage $V_{max}$. The V-t pattern of FIG. 4 is in principle the fastest way of tuning the capacitance upward from $C_{start}$ to $C_{final}$ The principle of this embodiment is to drive the system as fast as possible to the final desired position and then to apply the constraints, e.g. voltage, necessary to maintain the reached position.

More complicated V-t patterns can be devised when the settling time is an issue, e.g. in underdamped devices, as shown in FIG. 7 and described below.

In embodiments of the present invention two forms of tuning control are used: firstly overdriving the moveable member of a MEMS device with a high voltage, in this case the member is driven to its final position as fast as possible, and secondly application of active damping if the movable member is underdamped and has started to ring.

FIG. 6 shows a graph of a time response of the capacitance of the device for three different cases, for comparison.

FIG. 6 shows by comparison a first example of the effect applying the V-t pattern of FIG. 4. The upper curve is the response to a step-function actuation voltage from 0 V to $V_{final} = V_{max} = 30$ V, applied at $t = 500$ μs without pulses. The lower curve is the response to a step-function actuation voltage from 0 V to $V_{final} = 13.2$ V, without any pulses. This shows a longer settling time. The middle curve shows the response to a V-t pattern having a pulse to reduce settling delay similar to FIG. 4, with $V_{start} = 0$ V, $V_{max} = 30$ V, $V_{final} = 13.2$ V, and $\Delta t_{pulse}$ is 3 μs. Although there is some settling after the initial response, the gain in tuning speed is clearly illustrated by the middle curve. Regarding the transitions near $t = 500$ μs; the peaks at $t = 500$ and 503 μs are due to charging and discharging of the capacitors (e.g. via coax cables) in the measurement system, and so can be disregarded.

Compared to known uses of pulsed operation, the voltage pulse in the embodiments of the present invention is used for reducing tuning delay and is followed by a hold voltage ($V_{final}$) that stabilizes the final state.

The movable element of the device can become under damped for example when it has been packaged at low pressure using a hermetic package. This will increase the tuning speed but will also cause ringing, i.e. oscillation with the mechanical resonance frequency around the stable state.

When this ringing is detected it can be fed back into the driving voltage generator. If the driving voltage is made to oscillate with the same frequency but 180 degrees out of phase it effectively damps the oscillation of the device. This is the principle of active damping. FIG. 7 shows an example of a sequence of pulses for damping the ringing to reduce the settling time. The sequence has a period corresponding to a resonant frequency, and comprises a number of peaks and troughs above and below the given supply level, such that successive ones of the peaks and troughs are closer to the given supply level. The rate of reducing the peaks and troughs can be determined according to the amount of ringing. This can depend on the starting and final levels, and on the characteristics of the movable element, such as the spring constant, and air damping factors.

If appropriate, a feedback mechanism can be used so that the controller senses the output capacitance ringing and can adapt the control of the electrodes accordingly. The period of the pulses and their amplitudes could be adapted.

Figure 8:
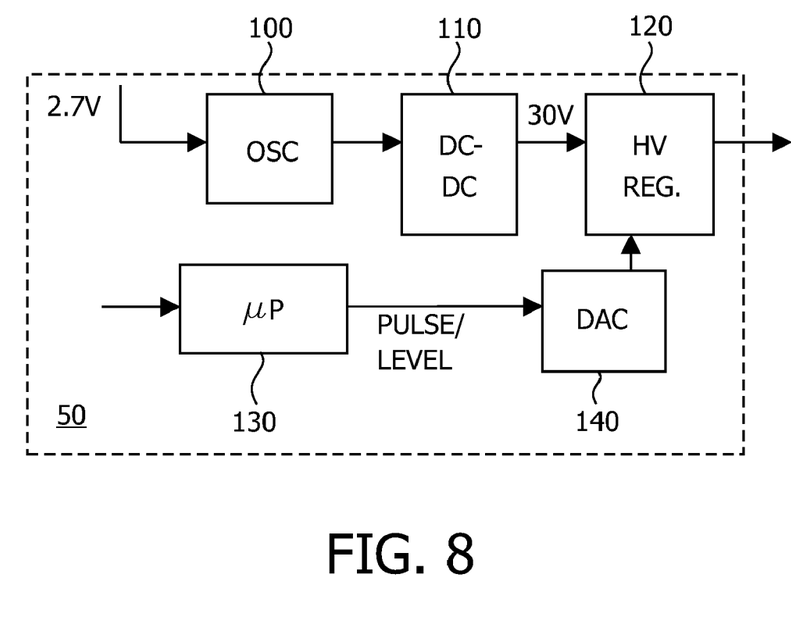
FIG. 8 shows parts of an electrode voltage controller according to an embodiment of the present invention.

FIG. 8 shows an example of parts of a controller, though other implementations can be envisaged. For many applications, a high voltage is used to improve tuning speed. As the driving voltage of the driving electrodes of the MEMS capacitors may exceed the voltage available in standard CMOS processes, a high-voltage generator chip is normally used. This chip can have a voltage regulator to make the V-t pattern described above. In the example of FIG. 8, the high voltage is generated using an oscillator 100, supplied by the low voltage supply used for other circuitry, typically 2.7 v, though other levels can be used. The oscillator feeds a DC to DC converter 110 which boosts the voltage. This can be achieved by a charge pump or other well known types of circuitry as desired. A 30V output is shown, though other levels can be used as needed. The amount of current needed will depend on the charge used when changing the differential voltage, and the rate of the changes.

Altering the differential voltage involves supplying a charge which will depend on the capacitance of the driving electrodes and on the voltage levels. This capacitance of the driving electrodes consists of two parts, the capacitance over the air gap and the capacitance over the dielectric. These two parts are connected in series, so the total capacitance can be derived. The mechanical equations to determine the motion of the movable element can be derived from the spring constant of the arrangement, a damping factor caused by the atmosphere surrounding the movable element, the electrical permittivity and the relative electrical permittivity of the dielectric. The charge needed to pull down the bridge completely may be extremely low, in the range of 50 pC (with a closed capacitance of ~10 pF and a voltage of 5 V). However, if a higher voltage is applied, this can result in a much higher charge being used.

The high voltage is fed to a voltage regulator 120 which outputs pulses and levels to the drive electrodes. The regulator can be implemented following established practice in high-voltage applications. An example is a MOSFET arranged as a variable resistor. This is controlled by a control signal which in this example is output by a DAC (digital to analog converter) 140, fed by a micro processor 130, which outputs digital representations of pulses and levels following a program and according to external inputs such as timing signals and feedback from elsewhere. The processor can be programmed using conventional programming languages. The processor circuitry and other parts can be implemented using logic circuitry or other digital hardware for example following established practice. The processor can use any conventional ASIC technologies, or be implemented as a hybrid of different technologies for example. The device may be implemented as a hybrid using different technologies to suit the differing requirements of MEMS structures, high voltage circuitry and low voltage logic and other circuitry.

The embodiments of the invention can be applied in many applications, notably RF architectures that use tunable capacitors to built adaptive networks. Examples are adaptive impedance matching networks and tunable LC tank circuits for VCO's in RF front ends for mobile communication, and adaptive filters for mobile TV or mobile communication base stations. The embodiments can encompass devices other than capacitors, any device which can exploit a movable element being repositioned to intermediate positions, including variable attenuators, optical beam deflectors, sensors and so on.

A micro-electromechanical device has been described having a substrate (60), a movable element (15), a pair of electrodes (40) arranged on the substrate and on the movable element to move the movable element, and an electrode voltage controller (50) to supply electrical power to the electrodes. To move the movable element to an intermediate position one or more pulses are applied at a first voltage higher than is necessary to hold the device at the intermediate position. This first voltage is applied for a time period which brings the device close to the intermediate position. The pulse or pulses during the movement can be timed to compensate for the inherent slowness of the device and/or under- or over-damping of the movement. In embodiments of the present invention two forms of control are used: overdriving with a high voltage when the moveable member of a MEMS device is closed, in this case the member is driven to its final position as fast as possible, and active damping when the moveable member is underdamped and ringing has started. This can reduce a settling delay. The invention can be applied to tunable RF capacitors. To control a decrease in the gap, a single pulse of a maximum supply level compensates for over-damping. To compensate for under-damping, additional pulses can be applied having a period corresponding to a resonant frequency, and comprise peaks and troughs above and below the final supply level, such that successive ones of the peaks and troughs are closer to the given supply level.

Applications of the present invention can be:
a microphone or a loudspeaker; (using a specific type of membrane)
a sensor, particularly an air pressure sensor
a resonator
pixel switches in a display, or driving a mirror for an optical switch,
a switch or as a variable capacitance in RF applications.

Other variations within the claims and other advantages can be envisaged by those skilled in the art.

The invention claimed is:

1. A micro-electromechanical device comprising:
a substrate,
a movable element,
a pair of electrodes arranged on the substrate and on the movable element to cooperate to move the movable element relative to the substrate, and
a controller arranged to supply electrical power to the electrodes to move the movable element to an intermediate position between a maximum and a minimum position, the controller providing a pulse or pulses having a first level higher than a second level required to hold the movable element at the intermediate position and then reducing to the second level to stabilize the movable element at the intermediate position, wherein the controller is arranged to control a voltage differential between the electrodes to vary an electrostatic force, wherein the controller supplies a single pulse of a maximum supply level to control an increase in a gap between the electrodes, and wherein the controller supplies a sequence of pulses timed to dampen oscillations of the movable element to control a decrease in the gap between the electrodes.

2. The device of claim 1, wherein the single pulse has a duration that is dependent on the supply levels before and after movement.

3. The device of claim 1, wherein the sequence is dependent on the supply levels before and after movement.

4. The device of claim 1, wherein the sequence has a period corresponding to a resonant frequency, and comprises a number of peaks and troughs above and below the given supply level, such that successive ones of the peaks and troughs are closer to the given supply level.

5. The device of claim 1, further comprising capacitor electrodes on the substrate and on the movable element, to form a tunable capacitor.

6. The device of claim 1, further comprising a resilient coupling to bias the movable element.

7. The device of claim 6, wherein the resilient coupling is arranged on at least two sides of the movable element.

8. A method of controlling a movable element of a microelectromechanical device having a substrate, a movable element, a pair of electrodes arranged on the substrate and on the movable element to cooperate to move the movable element relative to the substrate, the method comprising:

moving the movable element to a first intermediate position by supplying a single pulse of a maximum supply level to the electrodes, the maximum supply level at a level which is higher than a second level required to hold the movable element at the first intermediate position, wherein moving to the first intermediate position comprises increasing a gap between electrodes; and supplying the second level to stabilize the movable element at the first intermediate position after moving the movable element to the first intermediate position.

9. The method of claim 8, further comprising:

moving the movable element to a second intermediate position by supplying a sequence of pulses timed to dampen oscillations of the movable element to the electrodes during the movement, the pulses being at a level which is higher than a third level required to hold the movable element at the second intermediate position, wherein moving to the second intermediate position comprises decreasing the gap between electrodes; and supplying the third level to stabilize the movable element at the second intermediate position after moving the movable element to the second intermediate position.

10. The method of claim 8, wherein the single pulse has a duration that is dependent on supply levels before and after the movement.

11. A method of controlling a movable element of a microelectromechanical device having a substrate, a movable element, a pair of electrodes arranged on the substrate and on the movable element to cooperate to move the movable element relative to the substrate, the method comprising:

moving the movable element to an intermediate position by supplying a sequence of pulses timed to dampen oscillations of the movable element to the electrodes during the movement, the pulses being at a level which is higher than a second level required to hold the movable element at the intermediate position, wherein moving to the intermediate position comprises decreasing a gap between electrodes; and supplying the second level to stabilize the movable element at the intermediate position after moving the movable element to the intermediate position.

12. The method of claim 11, wherein the sequence is dependent on supply levels before and after the movement.

13. The method of claim 11, wherein the sequence has a period corresponding to a resonant frequency.

14. The method of claim 13, wherein the sequence comprises a number of peaks and troughs above and below the given supply level, wherein successive ones of the peaks and troughs are closer to the given supply level.

15. The method of claim 11, wherein the sequence comprises a number of peaks and troughs above and below the given supply level, wherein successive ones of the peaks and troughs are closer to the given supply level.

* * * * *